Dec. 23, 1924.
C. BARCHUS
1,520,393
PISTON RING CONTRACTING DEVICE
Filed March 21, 1922     2 Sheets-Sheet 2
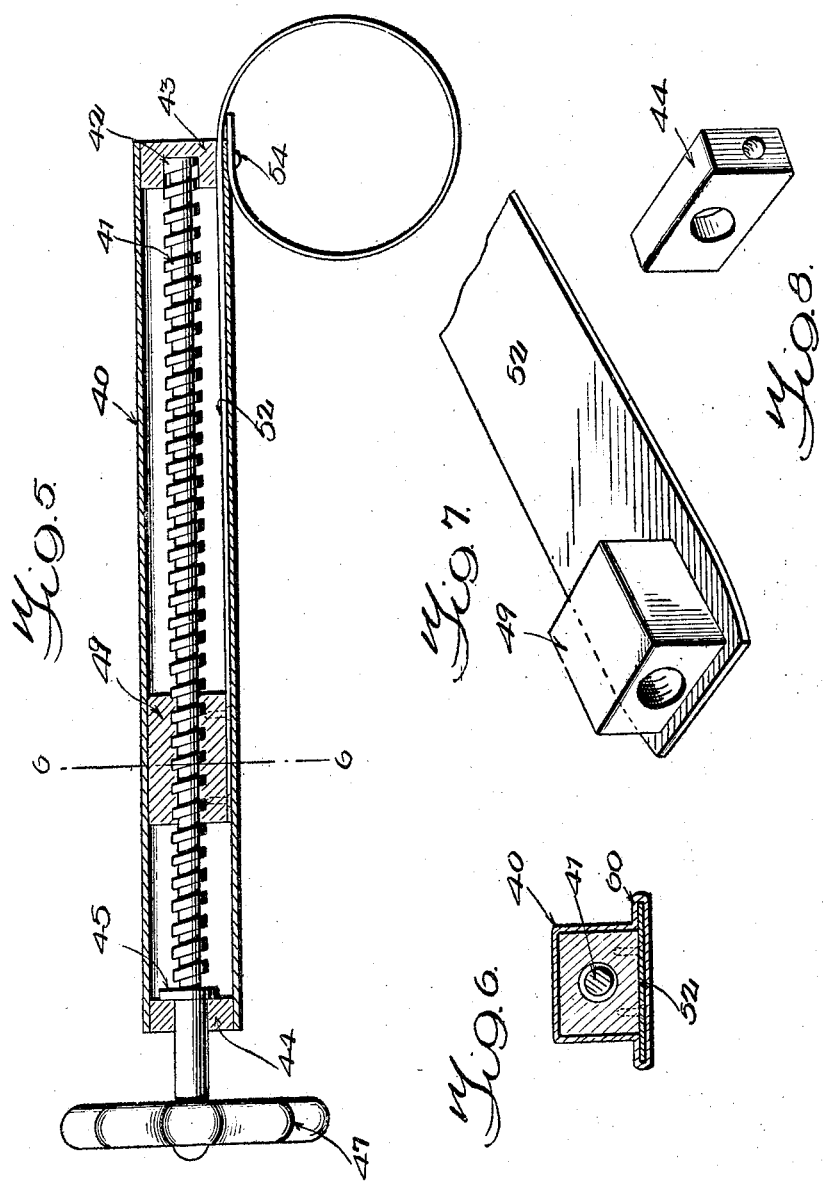

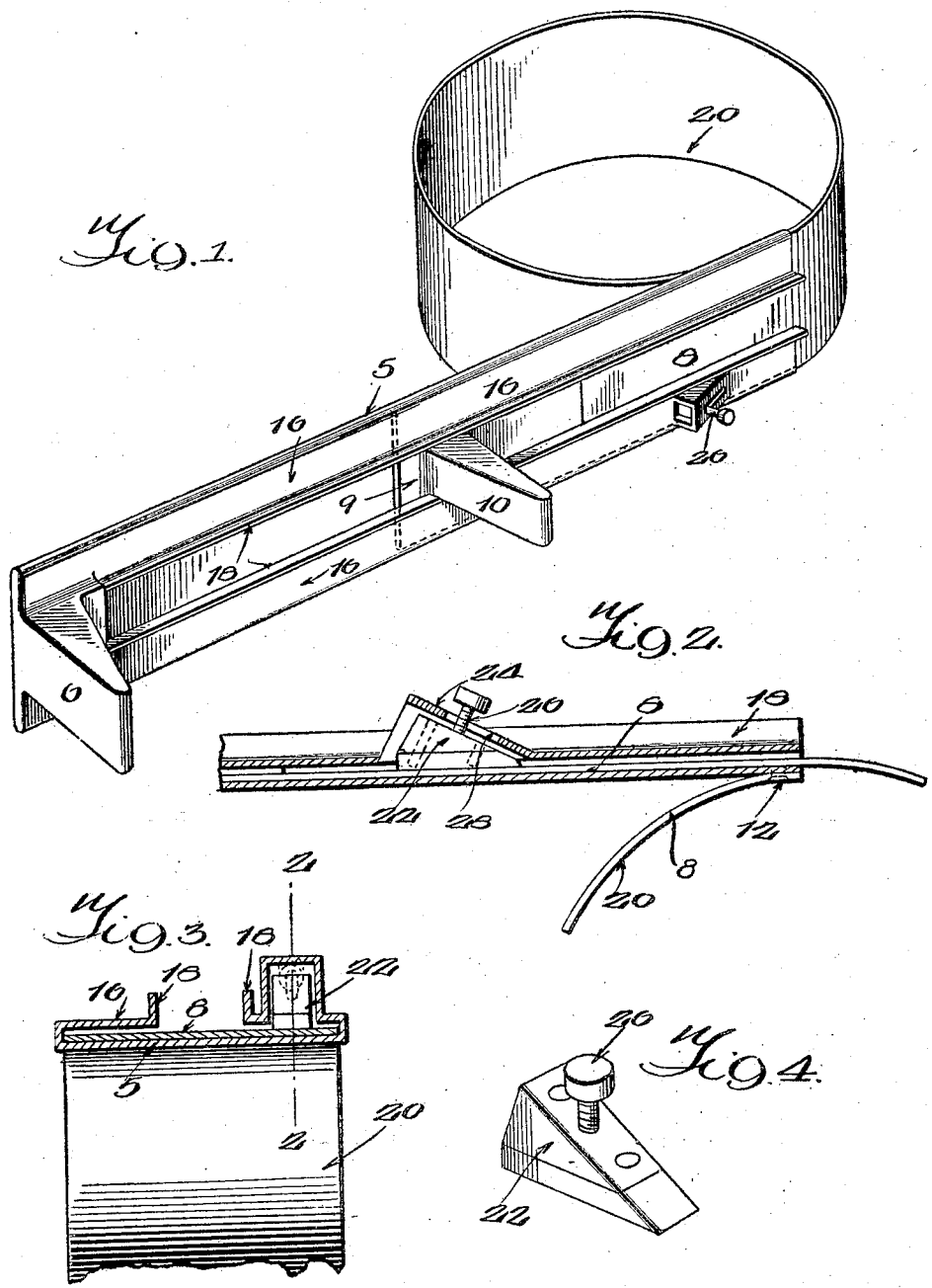

Patented Dec. 23, 1924.

1,520,393

UNITED STATES PATENT OFFICE.

CHARLES BARCHUS, OF NATCHEZ, MISSISSIPPI.

PISTON-RING-CONTRACTING DEVICE.

Application filed March 21, 1922. Serial No. 545,442.

*To all whom it may concern:*

Be it known that I, CHARLES BARCHUS, a citizen of the United States, and resident of Natchez, in the county of Adams and State of Mississippi, have invented certain new and useful Improvements in Piston-Ring-Contracting Devices, of which the following is a specification.

This invention relates to piston ring contracting devices especially adapted for use in contracting the rings of pistons so that the piston may be readily inserted into the cylinder.

The invention forming the subject matter of this application is an improvement over my co-pending application, Serial Number 526,303 and aims to provide an extremely simple device for contracting piston rings with a minimum of effort on the part of the operator.

Further the invention aims to provide a piston ring contracting device having novel means whereby the loop of the same may be conveniently varied in diameter, for use in connection with piston rings of different widths.

Also an important aim is to provide a piston ring contractor having simple means whereby the piston ring engaging loop may be held in a set position.

A further object is to provide a piston ring squeezer which is simple to operate, durable in use and cheap to manufacture.

Other objects and advantages of the invention will be apparent during the course of the following description.

In the accompanying drawing forming a part of this application and in which like numerals are employed to designate like parts throughout the same, Figure 1 is a perspective of the improved piston ring squeezer.

Figure 2 is a detailed longituidnal sectional view through the same, the view illustrating the means for holding the loop in a set position, the view being taken on line 2—2 of Figure 3.

Figure 3 is a vertical transverse sectional view through the improved piston ring squeezer.

Figure 4 is a perspective of a latch embodied in the invention.

Figure 5 is a longitudinal sectional view through a slightly modified form of invention.
Figure 6 is a vertical transverse sectional view taken on line 6—6 of Figure 5.

Figure 7 is a fragmentary perspective of a traveling nut and the band to which the same is connected.
Figure 8 is a perspective of an end block embodied in the invention and which limits the rearward movement of the feed screw.

In the drawing wherein for the purpose of illustration is shown several preferred embodiments of the invention the numeral 5 designates a flat casing or sheath of elongated formation, the said sheath having its rear portion formed with a stationary laterally projecting handle 6.
As illustrated in Fig. 1 a band 8 of flexible steel 8 or the like is slidable into the sheath 5 and has its rear portion welded or otherwise secured to the base plate 9 of a laterally projecting movable handle 10 which cooperates with the stationary handle 6. One end of the band 8 is anchored to one side of the sheath as indicated at 12.

One end of the band 8 is anchored to the sheath adjacent the point at which the band enters the sheath so that a complete circle or rope is at all times provided. That is to say, regardless of that portion of the band 8 which is extended beyond the sheath, a practically complete circle is maintained for engaging piston rings of different sizes.

In carrying out the invention one side wall of the sheath is slotted longitudinally for the reception of the movable handle 10 and the longitudinal slot provides a pair of overhanging flanges 16, the edge portions of which are extended outwardly to provide a guide 18 with which the sides of the handle 10 contact.

The loop which is designated by the numeral 20 may be held in a set or adjusted position by means of a triangular latch 22 slidable within a triangular casing 24. The latch 22 flatly contacts with the outer side of the band 8 and when an outward pull is exerted on the latch it will be drawn into the narrow end of the casing 24 whereby to lock the band in position. However, the longitudinal movement of the latch 22 is limited by means of a pin 26 extended through a slot 28 in the outer side of the casing 24.

This prevents the loss of the latch and at all times holds the same in position to engage the band 8.

In use the loop is extended about one or more piston rings and the adjacent portion of the piston and subsequently contracted whereby to hold the piston rings within the grooves in the piston. This permits the piston to be moved into the cylinders without interference by the piston rings.

The loop may be immediately disconnected from the piston by merely moving the handle 10 forwardly for the purpose of enlarging the loop. However, prior to moving the handle 10 forwardly the knob on the end of the pin 26 must be drawn rearwardly for releasing the band 8.

In the form of the invention illustrated in Figures 5 to 8 inclusive the sheath is designated by the numeral 40 and receives a feed screw 41, the forward end of which is received within the centrally arranged recess 42 of a stop block 43. The feed screw 41 is held against rearward movement by means of a stop block 44 securely held in the rear end of the sheath and engaged by an annular shoulder 45 formed on the rear portion of the feed screw. The feed screw 41 is extended rearwardly of the sheath and is provided with a handle 47 by means of which the feed screw may be manually rotated.

Figure 5 illustrates that a traveling nut 49 is movably arranged in the sheath and is provided with interior screw threads for engagement with the screw threads on the feed screw 14 whereby the rotation of the feed screw results in the movement of the traveling nut in the sheath.

The traveling nut has rigid connection with a band 52 extended out through the forward end of the sheath and is connected at its forward end to the forward end of the sheath by means of a fastening device 54. It is thus seen that the forward portion of the band is arranged in the form of a loop which is adapted to engage the piston ring whereby to effectively contract the same preparatory to inserting the piston having the piston ring into a cylinder.

In operation the feed screw 41 is manually rotated so as to advance or retract the traveling nut 49 and this advancement or retraction of the feed screw results in the expansion or contraction of the loop formed by the extended portion of the band 52 which incidentally is of spring metal as in the other form of the invention.

Figure 6 illustrates that the opposite sides of the sheath are formed with longitudinally extending guides ribs 60 having grooves to receive the edge portions of the band 52 thereby to effectively guide the band and to hold the same against buckling. Also the ribs 60 serve as a means for strengthening and reinforcing the sheath.

In carrying out the invention the rear end of the band 52 may be tapered so that it will slide freely within the sheath.

Having thus described the invention, what is claimed is:—

1. A piston ring squeezer comprising a sheath of elongated formation, a band of spring metal movable longitudinally of said sheath and having one end anchored to the sheath adjacent the forward end of the sheath whereby to provide a variable loop, and a handle connected to one end of said band for moving the band longitudinally of the sheath.

2. A piston ring squeezer comprising a sheath of elongated formation, a band of spring metal movable longitudinally of said sheath and having one end anchored to the sheath adjacent the forward end of the sheath whereby to provide a variable loop, and a handle connected to one end of said band, said sheath being provided with a longitudinal slot for the reception of said handle.

3. A piston ring squeezer comprising a sheath of elongated formation, a band of spring metal movable longitudinally of said sheath and having one end anchored to the sheath adjacent the forward end of the sheath whereby to provide a variable loop, and a handle connected to one end of said band, and means carried by the sheath to hold the band in a set position.

4. A piston ring squeezer comprising a sheath having a longitudinal slot defining a pair of spaced parallel flanges, the edge portions of which are extended outwardly to define guides, and a band of spring steel anchored to the forward end of said sheath and extending through the sheath whereby to define a loop, the rear end of said band to be provided with a handle extending through said slot and engaged by said guides.

5. A piston ring squeezer comprising a sheath having a longitudinal slot defining a pair of spaced parallel flanges, the edge portions of which are extended outwardly to define guides, and a band of spring steel anchored to the forward end of said sheath and extending through the sheath whereby to define a loop, the rear end of said band being provided with a handle extending through said slot and engaged by said guides, and a fixed handle connected to the rear portion of said sheath and joining said flanges.

6. A piston ring squeezer comprising a sheath having a longitudinal slot defining a pair of spaced parallel flanges, the edge portions of which are extended outwardly to define guides, a band of spring steel anchored to the forward end of said sheath and extending through the sheath whereby to define a loop, the rear end of said band being provided with a handle extending through said slot and engaged by said guides, a fixed handle connected to the rear portion of said sheath and joining said flanges, and means to hold the band in a set position.

7. A piston ring squeezer comprising a sheath having a fixed handle, a band anchored to the forward end of the sheath and having one end portion slidable into the sheath, a casing of triangular formation secured to said sheath and a triangular locking device arranged in said casing and adapted to engage the band.

CHARLES BARCHUS.